United States Patent [19]
Heubner et al.

[11] Patent Number: 6,101,502
[45] Date of Patent: Aug. 8, 2000

[54] OBJECT MODEL MAPPING AND RUNTIME ENGINE FOR EMPLOYING RELATIONAL DATABASE WITH OBJECT ORIENTED SOFTWARE

[75] Inventors: Robert A. Heubner, Topsfield; Gabriel Oancea, Lawrence; Robert P. Donald, Methuen; Jon E. Coleman, Chelmsford, all of Mass.

[73] Assignee: Ontos, Inc., Lowell, Mass.

[21] Appl. No.: 09/161,028

[22] Filed: Sep. 25, 1998

Related U.S. Application Data

[60] Provisional application No. 60/069,157, Dec. 9, 1997, and provisional application No. 60/059,939, Sep. 26, 1997.

[51] Int. Cl.$^7$ .................................................... G06F 17/30
[52] U.S. Cl. ............................................. 707/103; 707/104
[58] Field of Search .................................. 707/100–104; 709/302

[56] References Cited

U.S. PATENT DOCUMENTS

| | | | |
|---|---|---|---|
| 5,291,583 | 3/1994 | Bapat | 395/500 |
| 5,627,979 | 5/1997 | Chang et al. | 345/335 |
| 5,729,739 | 3/1998 | Cautin et al. | 707/104 |
| 5,752,027 | 5/1998 | Familiar | 395/614 |
| 5,809,505 | 9/1998 | Lo et al. | 707/102 |
| 5,812,996 | 9/1998 | Rubin et al. | 707/2 |
| 5,873,093 | 2/1999 | Williamson et al. | 707/103 |
| 5,878,411 | 3/1999 | Burroughs et al. | 707/4 |
| 5,937,409 | 8/1999 | Wetherbee | 707/103 |
| 5,956,725 | 9/1999 | Burroughs et al. | 707/101 |

*Primary Examiner*—Paul V. Kulik
*Attorney, Agent, or Firm*—Weingarten, Schurgin, Gagnebin & Hayes LLP

[57] ABSTRACT

A mapping between an object model and a relational database is generated to facilitate access to the relational database. The object model can be created from database schema or database schema can be created from the object model. Further, the mapping can be automatically generated. The Database schema, object model and mapping are employed to provide interface objects that are utilized by a runtime engine to facilitate access to the relational database by object oriented software applications.

18 Claims, 6 Drawing Sheets

OBJECT MODEL MAPPING AND RUNTIME ENGINE FOR EMPLOYING RELATIONAL DATABASE WITH OBJECT ORIENTED SOFTWARE

CROSS REFERENCE TO RELATED APPLICATIONS

A claim of priority is made to U.S. Provisional Patent Application Serial No. 60/069,157, entitled TIER 3 DESIGN SPECIFICATION, filed Dec. 9, 1997 and incorporated herein by reference; and U.S. Provisional Patent Application Serial No. 60/059,939, entitled DATABASE SYSTEM ARCHITECTURE, filed Sep. 26, 1997 and incorporated herein by reference.

STATEMENT REGARDING FEDERALLY SPONSORED RESEARCH OR DEVELOPMENT

N/A.

BACKGROUND OF THE INVENTION

The present invention is generally related to database technology, and more particularly to interfacing object oriented software applications with relational databases.

The need for interfacing object oriented software applications with relational databases is well known. One method of interfacing an object oriented application with a relational database is to adapt the requests made by the application to the relational database. More particularly, object operations are translated into relational database queries. However, this technique is processor-intensive and sacrifices some of the advantages associated with the object oriented model. As a result, the object oriented software application is unable to function efficiently.

Another method of interfacing an object oriented application with a relational database is to translate database information into a format which is compatible with the object oriented application. Relational databases typically separate data into a plurality of tables through a process known as "normalization" to minimize duplication. A normalized relational database includes a plurality of tables, wherein each table includes at least one field and one key, and at least one field in each table is uniquely dependent upon the key that is associated with the table. These tables can be translated into objects. However, the objects can become inaccurate when changes are made to the relational database. It is known to adapt to changes in the relational database by performing further translations, but this process requires substantial effort.

BRIEF SUMMARY OF THE INVENTION

In accordance with the present invention, a mapping between an object model and a relational database and a runtime engine are employed to facilitate access to a relational database. The object model can be created from database schema or database schema can be created from the object model. Further, the mapping can be automatically generated. The database schema, object model, and mapping are employed to provide interface objects that are utilized by an object oriented software application to access the relational database.

The present invention provides transparent access to the relational database. The interface objects and runtime engine perform read and write operations on the database, including generation of SQL code. Consequently, neither programmers nor software applications need have knowledge of the database structure, the database programming interface, database security, or the database transaction model in order to obtain access to the relational database. Further, changes to the relational database do not always necessitate additional mapping.

BRIEF DESCRIPTION OF THE DRAWING

Other features and advantages of the present invention will become apparent in light of the following detailed description of the drawing, in conjunction with the drawing, of which.

DETAILED DESCRIPTION OF THE INVENTION

Figure 1:
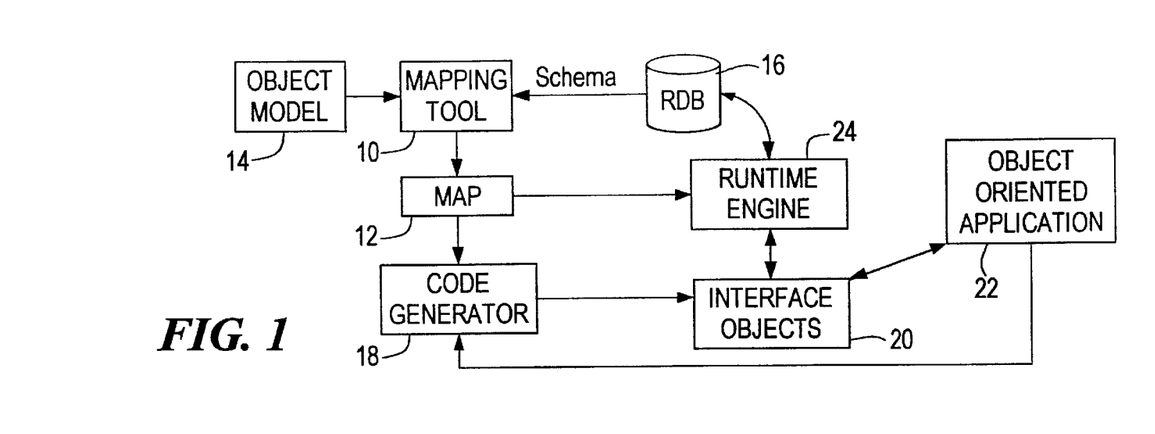
FIG. 1 is a block diagram that illustrates use of the map to generate interface objects that are employed by a runtime engine and an object oriented software application to access a relational database.

Referring to FIG. 1, a mapping tool 10 is employed to generate a map 12 in which relationships between an object model 14 and schema associated with a relational database 16 are defined. A code generator 18 is employed to examine the relationships that are defined in the map 12 and a model object oriented interface associated with an object oriented software application 22 to generate interface objects 20. The interface objects 20 are employed by the object oriented software application 22 to access the relational database 16 via a runtime engine 24, which also uses the map 12 to drive its processing.

The object model 14 is a template that has a predetermined standardized structure. The illustrated object model includes attributes and inheritance relationships that are mapped to relational database features such as tables, rows, columns, keys, and foreign keys. Mapping the object model to the relational database schema includes mapping a class attribute to a table column, mapping a class attribute to a 1-1, 1-N, or N-N relationship, and mapping class inheritance to rows within a table or across tables.

Figure 2:
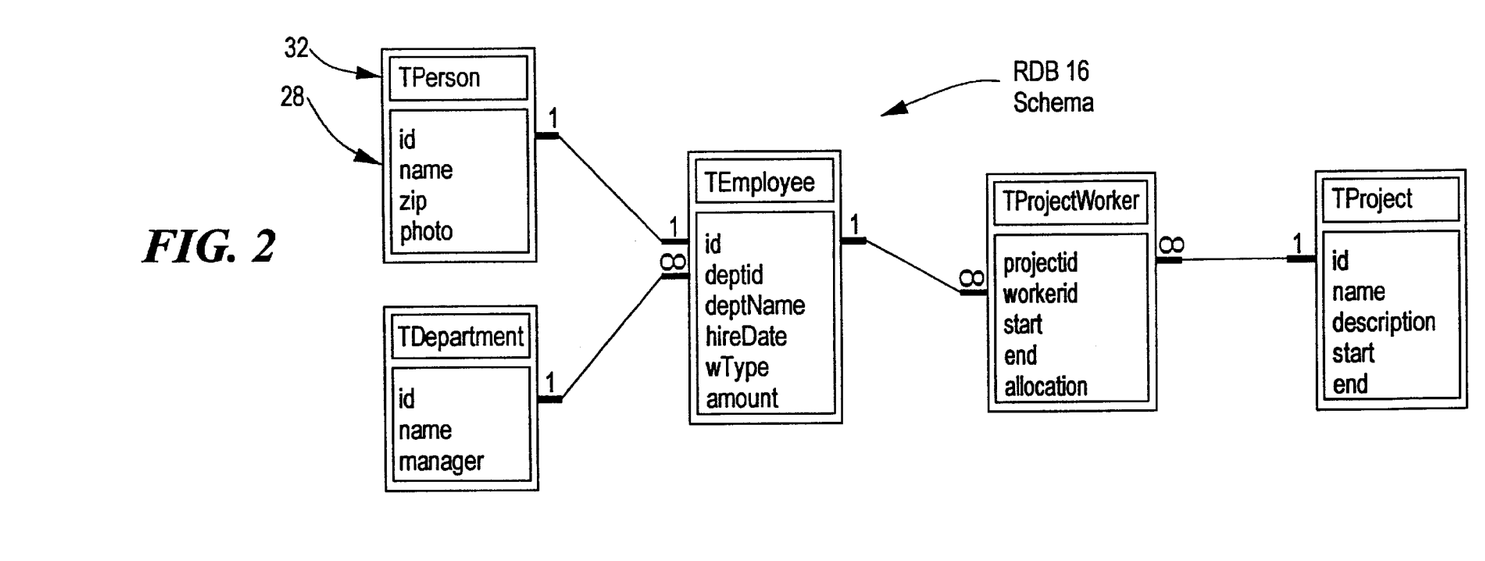
FIG. 2 is a block diagram of database schema.
Figure 3:
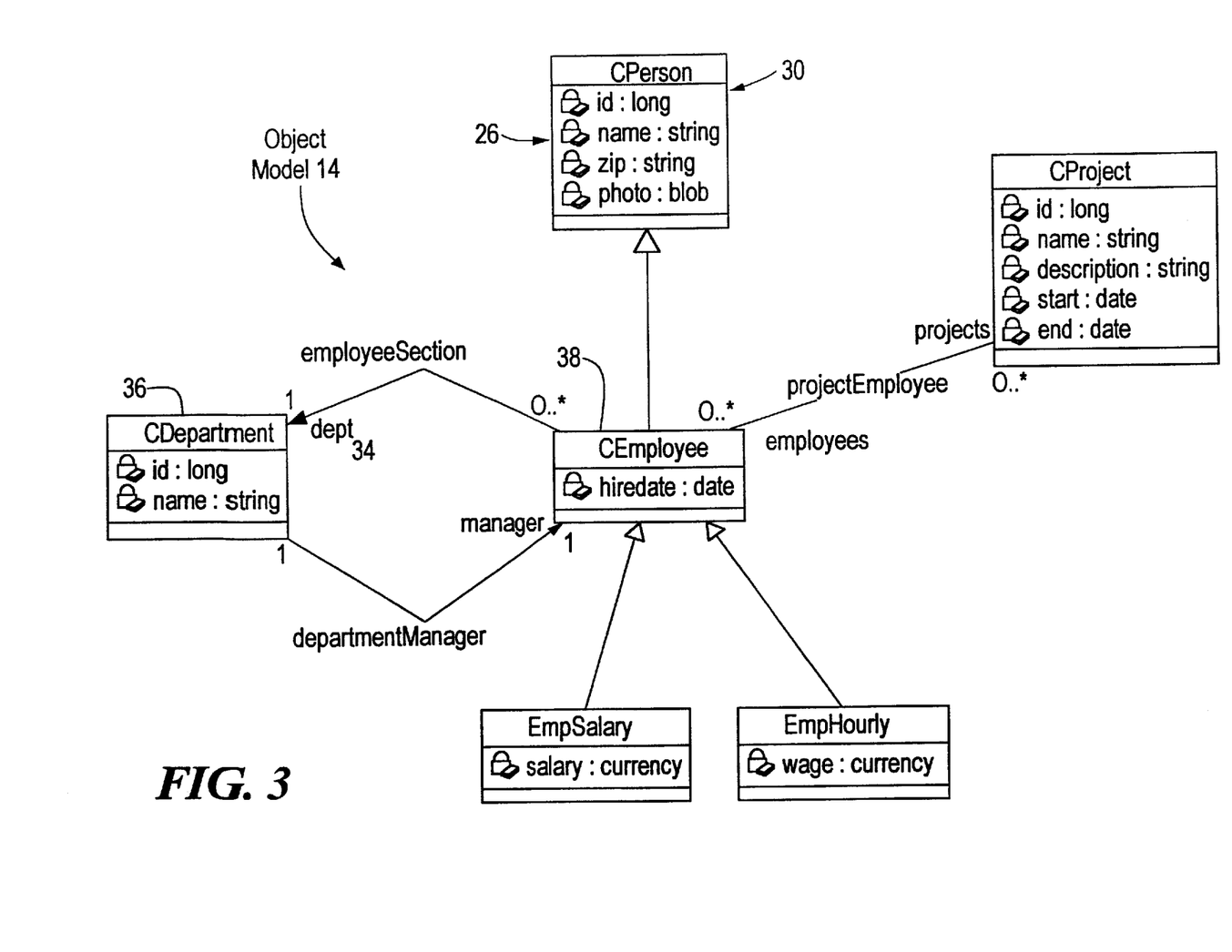
FIG. 3 is a block diagram of an object model.
Figure 4:
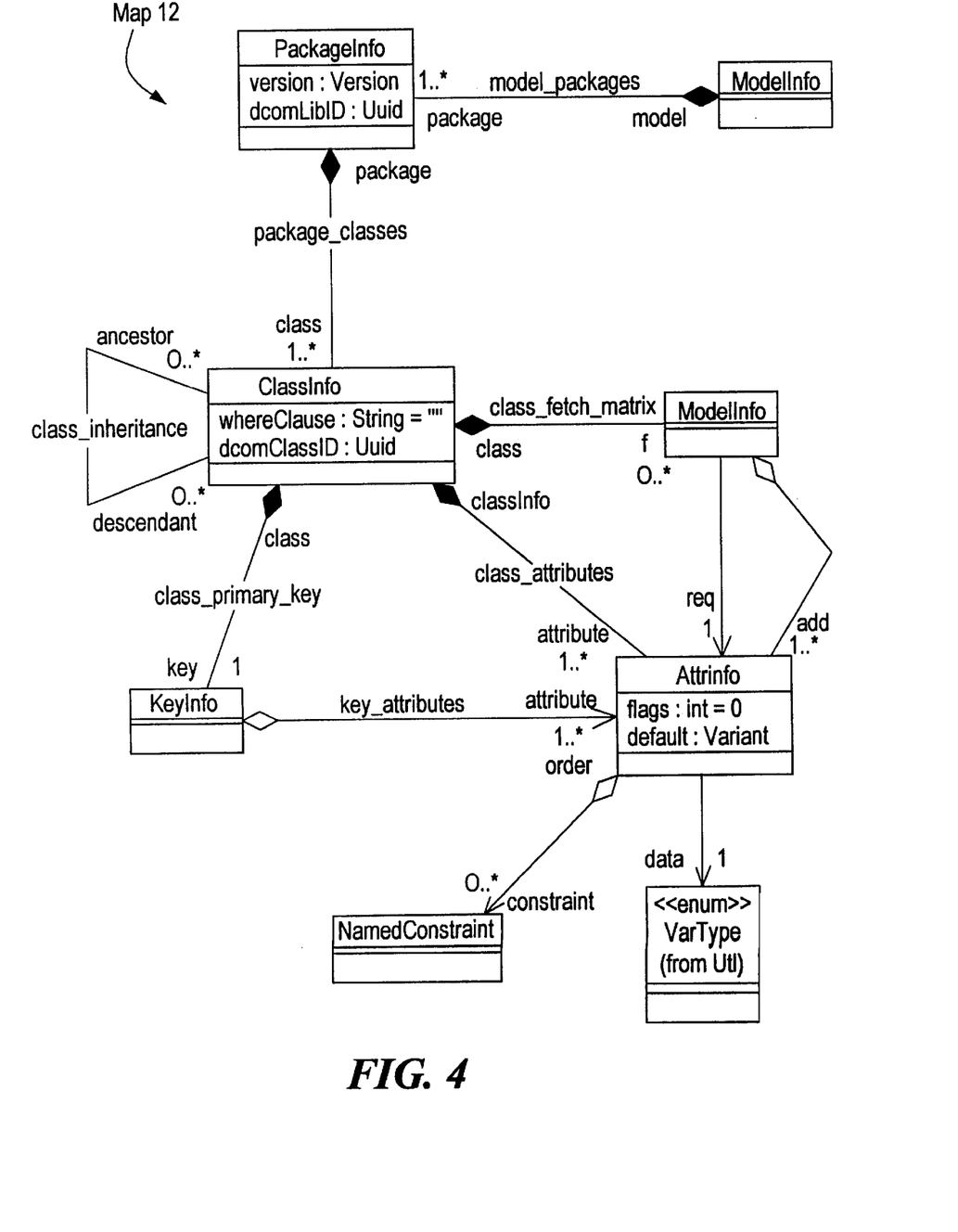
FIG. 4 is an object diagram of a mapping.

Referring now to FIGS. 2, 3 and 4, the mapping of a class attribute to a table column can be described generally as: Class Attribute→Table Column+Class Key+Joins. Mapping the class attribute defines where the attributes are read from and written to. In the illustrated example, the class attribute CPerson.name 26 maps to table column TPerson.name 28. The "Class Key" is employed to relate an object instance to a row in the table. In particular, key values of the class are mapped to columns in a table that comprise the primary key. In the illustrated example, CPerson.id 30 maps to TPerson.id 32. "Joins" defines keys between tables within a class. Since there is only one table in the mapping of Cperson.name to Tperson.name, no information is required for Joins. If Cperson includes two tables, such as Tperson and X, then mapping Cperson.y to X.y includes: Cperson.y Maps to X.y+Cperson.id Keys to Tperson.id+Tperson.id Joins to X.id.

Mapping a class attribute to a 1-1, 1-N, or N-N relationship with at least one other object can be described generally as: Class Attribute→Class+Class Attribute→Foreign Key+ Joins. When an object has associations to other objects, an attribute in the object points to one or multiple other objects. If the object points to only one object, there is a one-to-one (1-1) association between the objects. If an object points to multiple objects, there is either a one-to-many (1-N) or many-to-many (N-N) relationship between the objects. In the illustrated example, CEmployee.dept 34 maps to Cdepartment 36, where CEmployee 38 to CDepartment 36 is a one to one relationship. "Foreign Key" represents identifying the foreign key. If CEmployee is related to CDepartment, there is a foreign key to another table. The foreign key is identified within one of the tables that comprise Cemployee and is related to the class attribute Cemployee.dept. This relationship may be inferred from foreign key information in the database schema. It is also possible that foreign key information is missing or that there are many foreign keys in CEmployee to CDept. Consequently, this step involves selecting columns that represent the foreign key. In the illustrated example, Cemployee.dept is associated with TEmployee.deptid. Once a class attribute is associated with the foreign key which resides in that class, "Joins" is defined to associated classes. In the illustrated example, TEmployee.deptid joins to TDepartment.id is defined.

Mapping class inheritance to rows within a table or across tables is performed by specifying a WHERE clause on the class which can distinguish the class from the associated parent class. This information is stored in the mapping model.

Table 1 describes how an object model can be mapped to structures in a database schema.

TABLE 1

| In object model: | Can be mapped to: |
| --- | --- |
| A single class | All or selected columns in a table. A WHERE clause can be associated with a class to specify which rows of the table belong to the class. |
| | Multiple tables that are joined by the same primary key, or by a unique foreign key relationship. If the same data is stored in multiple tables, the duplicate columns can be handled by mapping one of the table columns for read, and all of the columns for insert and update. |
| | Multiple tables, possibly in different databases, which have similar column definitions (e.g., EastEmployees and WestEmployees tables can be merged as a single Employees class). |
| | Multiple tables that are unrelated in the database, if a logical relationship can be defined in the mapping. |
| Single inherited classes | A single denormalized table. Columns that contain data for all records are typically mapped to the superclass, and a WHERE clause is defined for each subclass as a discriminator for selecting which rows belong to the given subclass. |
| | Multiple tables that have the same primary keys. To ensure uniqueness of records, the primary keys of "subclass" tables may also be defined as foreign keys for the "superclass" table. |
| Multiple inherited classes | A single denormalized table. Different columns are mapped to each of the classes. Typically, there are multiple columns that can be used as indexes. The subclass mapping has multiple joins defined, which are used to traverse each of the inheritance relationships. |

TABLE 1-continued

| In object model: | Can be mapped to: |
| --- | --- |
| | Multiple indexed tables. The table that is mapped to the subclass has multiple keys corresponding to each of the keys in the superclass tables. To ensure uniqueness of records in the subclass table, the key on the subclass table may not be defined as a multi-column key. If all the data of the superclass tables is duplicated in the subclass table, then no join is required to instantiate an instance of the subclass. However, joins would be needed to ensure integrity of data when performing insert, remove, and update operations. |

Object relationships are mapped to the database schema by defining the joins needed to access related objects or groups of objects (lists). The joins make use of foreign keys defined in the tables that are mapped to the related classes. Table 2 describes mapping of object relationships relative to the illustrated example.

TABLE 2

| Object Relationship: | Mapping Example: |
| --- | --- |
| 1-1 object relationship | Department can have only one Manager. Department class has an object attribute (Manager) that references only one instance of the Employee class. Department table has a foreign key column (ManagerID) that references only one row in the Employee table. A join is defined for the Department class based on a unique foreign key. |
| N-1 object relationship | Many Employees have one Department. The Employee class has an object attribute (Department) that references one instance of the Department class. The Employee table has a foreign key column (DeptID) that references one row in the Department table. A join is defined for the employee class to access the one row in the Department table that is referenced by the foreign key in the Employee table. |
| 1-N object relationship | A Department has many Employees. The Department class has a list attribute (Employees) that references the related group of employees. Employee table has a non-unique foreign key that references the Department table. A join is defined for the Department class that selects all rows in Employee that matches the current Department's Deptid. |
| N-N object relationship | An Employee can have many Projects. A project can have many Employees. The Employee class has a list attribute that references a group of Projects, and the Project class has a list attribute that references a group of Employees. This mapping uses joins based on the join table that relates the Employee table and the Project table. The Employee class uses a join to select rows from the Project table that match the current instance's Employeeid. The project class uses a join to select rows from the Employee table that match the current instance's Projectid. |

Table 3 describes how structures in a database schema can be mapped to structures in an object model.

TABLE 3

| In a database schema: | Can be mapped to: |
|---|---|
| Rows, discriminated by WHERE clause | All attributes of a single class |
| A single table | All attributes of a class, assuming the other persistent attributes of the class are mapped to columns in other tables. Multiple classes (effectively, a vertical split of the table) A single-inherited classes (if at least one column is appropriate for discriminating selection of rows for subclasses) Multiple-inherited classes (if the table has multiple indexes) |
| Multiple tables, different columns | A single class (if the key structure exists to join row uniquely) Multiple classes (unrelated, unless key structure exists to support joins) |
| Multiple table, same columns | A single class that represents a logical merge of the tables. (NOTE: Primary key values must be unique between the tables.) |
| Multiple tables, same primary key | Single inherited classes (each table represents a class, keys used to define joins between subclass tables and superclass table. single class (with joins based on primary key) |

If the same data is stored in multiple tables, the duplicate columns can be handled by mapping one of the table.columns for read, and all of the columns for insert and update.

Schema relationships are mapped directly to object relationships, either in the form of object attributes or list attributes. In general, a foreign key in the database schema is mapped to an inverse relationship between an object attribute (on the class mapped to the table holding a foreign key) and a list attribute (on the class mapped to the table referenced by a foreign key). A join table is mapped to an inverse relationship between list attributes defined on each of the classes mapped to the tables related by the join table.

Table 4 describes how relational keys are mapped to object relationships relative to the illustrated example.

TABLE 4

| Schema Relationship | Corresponding Object Relationship |
|---|---|
| Unique Foreign Key | 1-only-1 object relationship represented by an object attribute with a cardinality of one on the class mapped to the table that has the foreign key. This relationship can also be mapped as an embedded type. |
| Non-Unique Foreign Key | N-1 object relationship, represented by an object attribute on the class mapped to the table with the foreign key, and a list attribute on the class mapped to the table referenced by the foreign key. |
| Join Table (with no other data columns) | N-N object relationship, represented by a list attribute on each of the classes mapped to the tables related by the join. Each list attribute represents a collection of references to objects of the other type. |
| Join Table (with additional data columns) | A class mapped to the join table, AND a N-N object relationship, represented by a list attribute on each of the classes mapped to the tables related to the join. |

Figure 5:
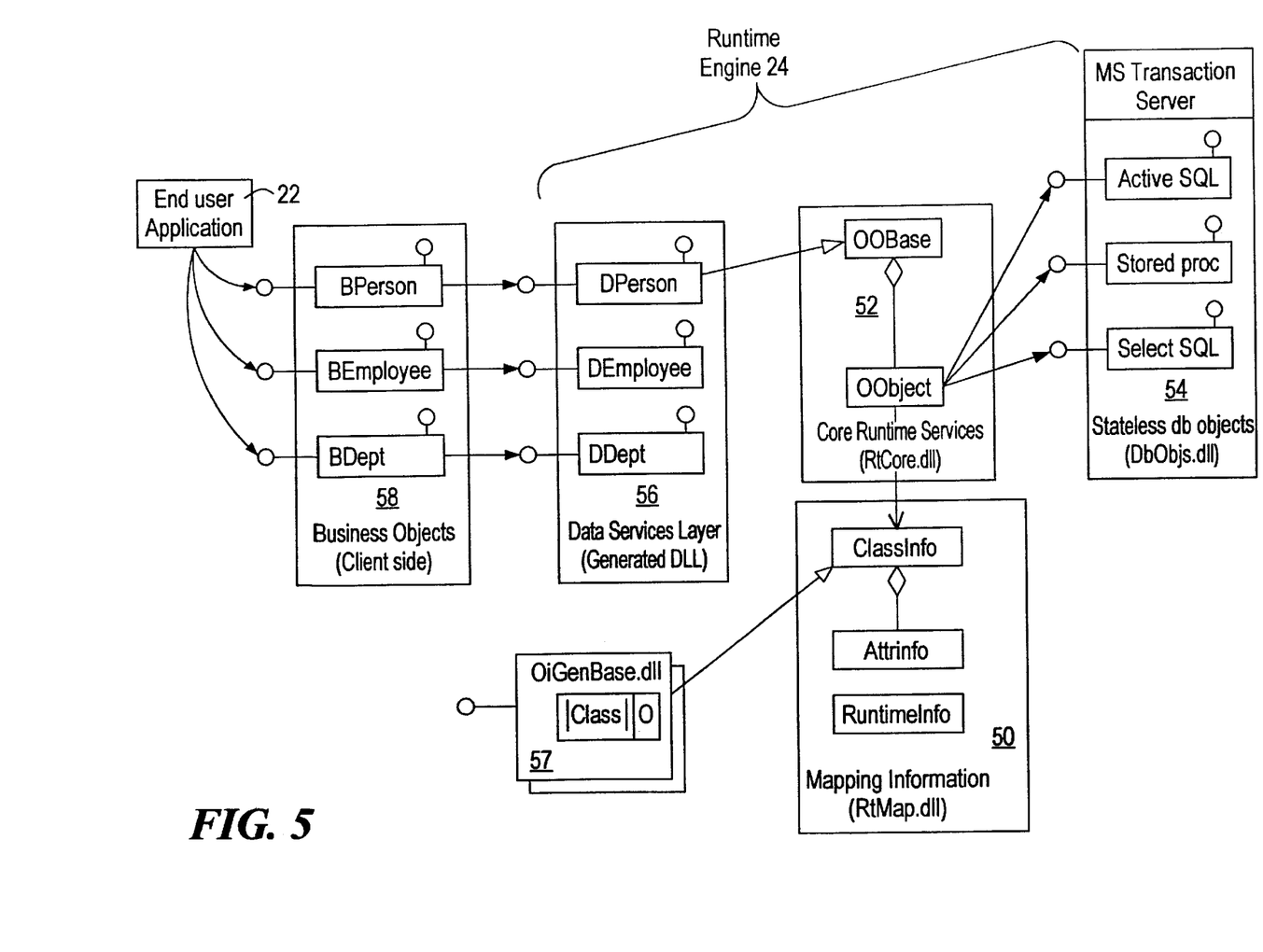
FIG. 5 is an object diagram of the runtime engine.
Figure 6:
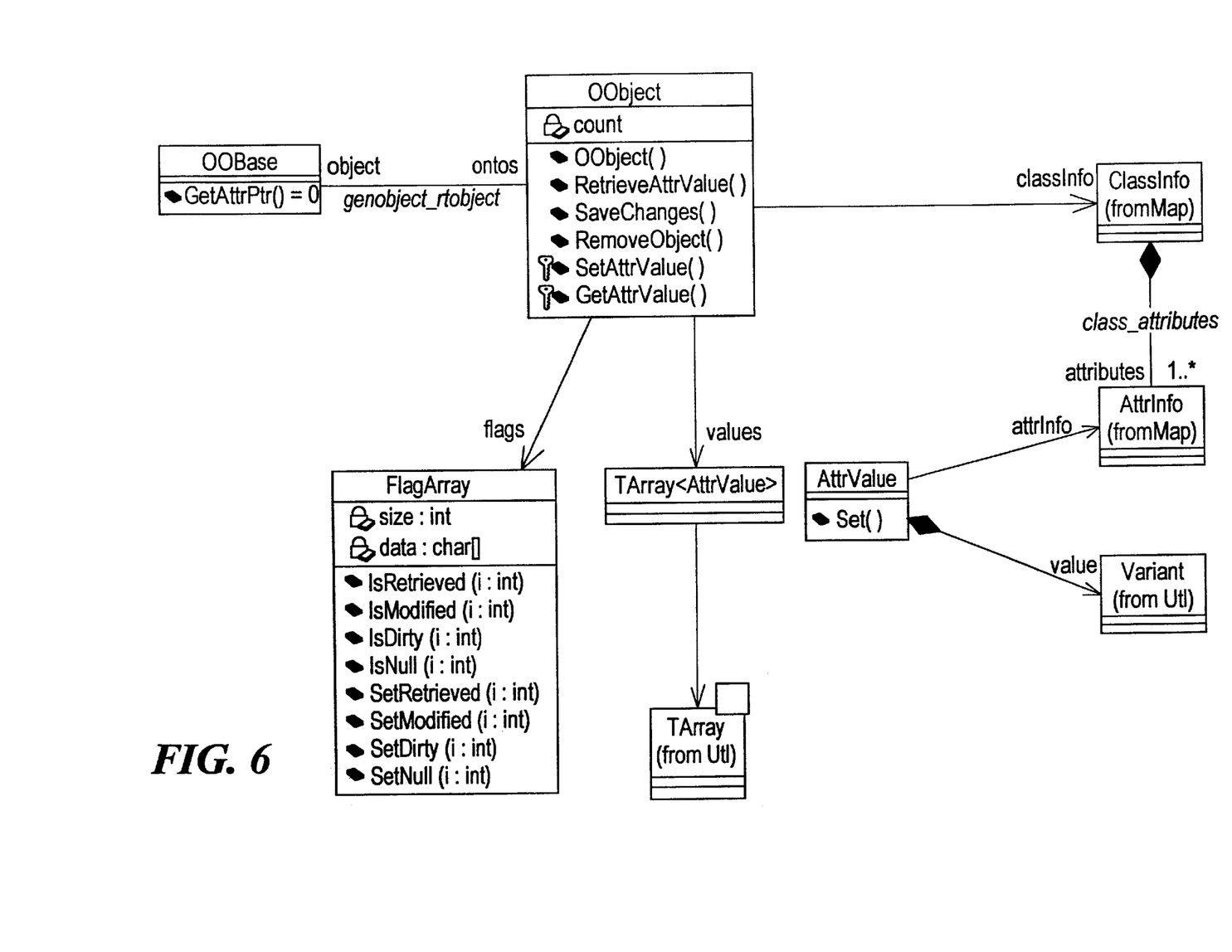
FIG. 6 is an object diagram of RtCore.DLL.

Referring to FIGS. 5 and 6, the runtime engine comprises a plurality of dynamic link libraries ("DLLs") including: RtMap.dll 50, RtCore.dll 52, DbObjs.dll 54, OiGenBase.dll 57, and a set of generated DLLs 56. The generated DLLs 56 contain one COM interface and implementation class for each class defined by a mapping model. A mapping model binary file is generated in parallel with each DLL containing the mapping information associated with the DLL. The RtMap.dll 50 implements the classes that can load the information from the binary file at runtime and make it available to the runtime interface objects associated with DLLs 56 and to the client objects 58 of the generated COM objects through a set of predefined COM interfaces.

Classes OOBase and OObject in RtCore.dll 52 form the core of the runtime engine 24. The OOBase is a base abstract class which is used as a base for all the generated implementation classes. The generated classes are ATL COM objects implementing one of the standard IDslObject/ IDslList/IDslQlist and one or more of the client interfaces (e.g., Employee). The ATL implementation classes have state implemented as a set of attributes of the primitive types called the "front state" (or the front data set). The OOBase contains a pointer to the OObject and a public pure virtual method to access the address of each attribute in the classes descending from itself. The attributes are indexed according to the class definition for the object. The OObject class is abstracting the runtime functionality for a generic object. It contains a set of attribute info-value pairs (one per attribute, constructed when the object is initialized to form a "back state," or baseline). OObject also has a set of attribute flags (one per attribute, bitwise or of values like isModified, isRetrieved, isDirty, isNull and others). One instance of the OObject is created for every instance of the generated objects to take care of the interface to the persistent data storage through a set of DB objects that are MTS stateless, transactional objects.

Figure 7:
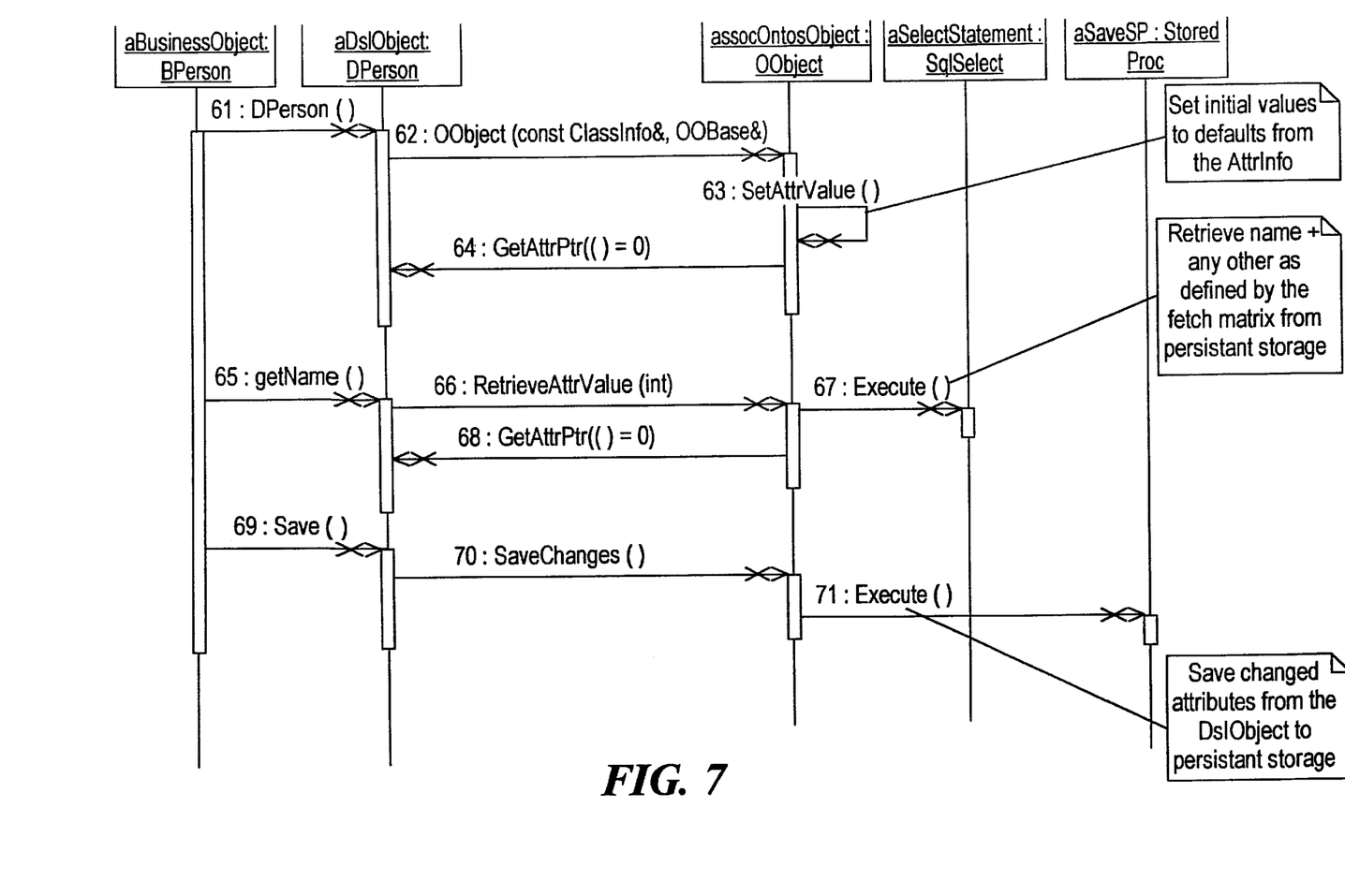
FIG. 7 is a sequence diagram that illustrates operation of the runtime engine.

FIG. 7 illustrates the sequence of actions that take place when a business object creates a Dsl object in step 61, accesses the name property in step 65 and saves the object in step 69. OObject is constructed when the constructor of the DPerson (the generated COM implementation class) is invoked in step 62. The constructor passes as parameters the appropriate constant ClassInfo reference and a reference to itself. The OOBject initializes all flags and sets the attributes to the default values as defined in the AttrInfo objects associated with the ClassInfo in step 63. The GetAttrPtr( ) function defined by the OOBase is employed to get the attribute address for each attribute in the class in order to initialize the front set of attributes on the object in step 64.

When the getName (propget) of the generated object is called in step 65, the generated code checks to see if the attribute was retrieved. If the attribute was retrieved then the cached value is returned. Otherwise, RetrieveAttrValue( ) of the OObject is called in step 66, passing the id of the desired attribute (name in the example). The OObject will look at the fetch matrix for this attribute and see what other attributes should be retrieved with it in step 67 and then determines what tables and columns are involved, how they are joined and executes the appropriate SQL statements using the stateless MTS object. The GetAttrPtr( ) function defined by the OOBase is employed to get the attribute address for each attribute in the class in step 68.

When the object is saved in step 69, the generated code calls the OObject SaveChange( ) method in step 70. The OObject determines what attributes have changed and, depending on the concurrency control mode in effect, makes sure the appropriate locks and transactions are set and respectively open and then executes the appropriate SQL to write the data to the persistent storage in step 71.

Referring again to FIGS. 1–4, the runtime engine also includes a plurality of performance enhancing features such as optimized data retrieval algorithms. An attribute retrieval can be associated with each attribute to optimize attribute retrieval from the database. As a default case, all attributes are retrieved when any one of an object's attributes are needed. However, the attribute retrieval list for any attribute can be edited to specify different attribute retrieval behavior. For example, a request for an Employee Id may cause the Photo attribute to be dropped from the attribute retrieval list on the Id attribute if that data resides in another table and is only infrequently used. Attribute retrieval lists are a performance feature that enable optimized data access by only doing JOINS and additional SELECT statements when the data returned by those actions is needed.

Performance is also enhanced by "just in time" data retrieval. By default, whenever an attribute value is read from the database, all of the other attributes for that instance are also read. However, Data Component Developers are permitted to modify the mapping information for a Data Component to define an attribute retrieval group for each attribute of a class that determines which other attribute values are returned when the requested attribute is read from the database. This makes it possible to avoid executing JOINs or SELECTs to retrieve data that may not be needed. For example, assume that a class, CPerson, has four attributes: Id, Name, Zip, and Photo, and the Photo attribute is mapped to a column in a different table from the others. The Data Component Developer may drop Photo from the group of attributes that are retrieved when either Id, Name, or Zip are read. A query is issued to get the Name and Id of a instance of CPerson where Id=10. Based on the attribute retrieval information, the run time engine retrieves only the values for the person.id, person.name, and person.zip attributes, thus avoiding an unnecessary join to return the photo attribute value as well.

If an object does not have an attribute in memory when an attempt is made to use that attribute, the object will issue a SELECT statement to retrieve the attribute from the database. "Just-in-time" attribute population allows the object to be populated with the minimal amount of information necessary for the application while still making any remaining information available when it is needed.

Lazy reads are also employed to enhance runtime performance. When a query is defined to identify objects for retrieval from the database, the SQL SELECT statement is not issued immediately. Queries are executed only after an attempt has been made to use or modify the resulting data.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. A method for interfacing an object oriented software application with a relational database, comprising the steps of:

selecting an object model;

generating a map of at least some relationships between schema in the database and the selected object model;

employing the map to create at least one interface object associated with an object corresponding to a class associated with the object oriented software application; and utilizing a runtime engine which invokes said at least one interface object with the object oriented application to access data from the relational database.

2. The method of claim 1 further including the step of mapping a class attribute to a table column.

3. The method of claim 1 further including the step of mapping a class attribute to a 1-1 relationship.

4. The method of claim 1 further including the step of mapping a class attribute to a 1-N relationship, where N is an integer that is greater than 1.

5. The method of claim 1 further including the step of mapping a class attribute to an N-N relationship, where N is an integer that is greater than 1.

6. The method of claim 1 further including the step of mapping class inheritance to rows within a table.

7. The method of claim 1 further including the step of mapping class inheritance across a plurality of tables.

8. The method of claim 1 further including the step of creating a plurality of said interface objects.

9. The method of claim 8 further including the step of creating at least one stateful interface object and at least one stateless interface object.

10. A computer program fixed on a computer-readable medium and adapted to operate on a computer to provide access to a relational database for an object oriented software application, comprising:

a mapping routine that generates a map of at least some relationships between schema in the database and a selected object model;

a code generator that employs said map to create at least one interface object associated with an object corresponding to a class associated with the object oriented software application; and a runtime engine that invokes said at least one interface object to access data from the relational database.

11. The program of claim 10 wherein said mapping routine is operative to map a class attribute to a table column.

12. The program of claim 10 wherein said mapping routine is operative to map a class attribute to a 1-1 relationship.

13. The program of claim 10 wherein said mapping routine is operative to map a class attribute to a 1-N relationship, where N is an integer that is greater than 1.

14. The program of claim 10 wherein said mapping routine is operative to map a class attribute to an N-N relationship, where N is an integer that is greater than 1.

15. The program of claim 10 wherein said mapping routine is operative to map class inheritance to rows within a table.

16. The program of claim 10 wherein said mapping routine is operative to map class inheritance across a plurality of tables.

17. The program of claim 10 wherein said code generator is operative to create a plurality of said interface objects.

18. The program of claim 17 wherein said code generator is operative to create at least one stateful interface object and at least one stateless interface object.

* * * * *

UNITED STATES PATENT AND TRADEMARK OFFICE
CERTIFICATE OF CORRECTION

PATENT NO. : 6,101,502
DATED : August 8, 2000
INVENTOR(S) : Robert A. Huebner et al.

It is certified that error appears in the above-identified patent and that said Letters Patent is hereby corrected as shown below:

Title page,
In the heading, "Heubner et al.", should read -- Huebner et al. --; and Item [75], Inventors, "Robert A. Heubner", should read -- Robert A. Huebner --.

Signed and Sealed this

Twentieth Day of November, 2001

Attest:

*Nicholas P. Godici*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,101,502 C1
APPLICATION NO. : 90/008452
DATED : November 10, 2009
INVENTOR(S) : Huebner et al.

Page 1 of 1

It is certified that error appears in the above-identified patent and that said Letters Patent is hereby corrected as shown below:

On the front of the Ex Parte Reexamination Certificate, at item 73 for Assignee, delete "Firestar Software, Inc., Framingham, MA (US)" and insert --DataTern, Inc., New York, NY (US)--

Signed and Sealed this

Sixteenth Day of March, 2010

David J. Kappos
*Director of the United States Patent and Trademark Office*

(12) EX PARTE REEXAMINATION CERTIFICATE (7148th)
United States Patent
Huebner et al.

(10) Number: US 6,101,502 C1
(45) Certificate Issued: Nov. 10, 2009

(54) OBJECT MODEL MAPPING AND RUNTIME ENGINE FOR EMPLOYING RELATIONAL DATABASE WITH OBJECT ORIENTED SOFTWARE

(75) Inventors: Robert A. Huebner, Topsfield, MA (US); Gabriel Oancea, Lawrence, MA (US); Robert P. Donald, Methuen, MA (US); Jon E. Coleman, Chelmsford, MA (US)

(73) Assignee: Firestar Software, Inc., Framingham, MA (US)

Reexamination Request:
No. 90/008,452, Jan. 25, 2007

Reexamination Certificate for:
Patent No.: 6,101,502
Issued: Aug. 8, 2000
Appl. No.: 09/161,028
Filed: Sep. 25, 1998

Certificate of Correction issued Nov. 20, 2001.

Related U.S. Application Data
(60) Provisional application No. 60/069,157, filed on Dec. 9, 1997, and provisional application No. 60/059,939, filed on Sep. 26, 1997.

(51) Int. Cl.
G06F 17/30 (2006.01)

(52) U.S. Cl. .................. 707/103 R; 707/104.1
(58) Field of Classification Search .............. None
See application file for complete search history.

(56) References Cited

U.S. PATENT DOCUMENTS

| | | | |
|---|---|---|---|
| 4,525,780 A | 6/1985 | Bratt et al. | |
| 4,853,843 A | 8/1989 | Ecklund | |
| 4,864,497 A | 9/1989 | Lowry et al. | |
| 4,930,071 A | 5/1990 | Tou et al. | |
| 4,953,080 A | 8/1990 | Dysart et al. | |
| 4,989,132 A | 1/1991 | Mellender et al. | |
| 5,008,853 A | 4/1991 | Bly et al. | |
| 5,010,478 A | 4/1991 | Deran | |
| 5,079,695 A | 1/1992 | Dysart et al. | |
| 5,093,914 A | 3/1992 | Coplien et al. | |
| 5,113,522 A | 5/1992 | Dinwiddie, Jr. et al. | |
| 5,125,091 A | 6/1992 | Staas, Jr. et al. | |
| 5,129,083 A | 7/1992 | Cutler et al. | |
| 5,129,084 A | 7/1992 | Kelly, Jr. et al. | |
| 5,136,712 A | 8/1992 | Perazzoli, Jr. et al. | |

(Continued)

FOREIGN PATENT DOCUMENTS

| CA | 2147421 | 10/1995 |
|---|---|---|
| WO | WO 97/07470 | 2/1997 |
| WO | 99/09494 | 2/1999 |

OTHER PUBLICATIONS http://www.pcmag.com/encyclopedia_term/0,2542,t=run time+engine&i=56079,00.asp.*

Microsoft Press. Computer Dictionary. $3^{rd}$ Edition, pp. 448–449. 1997.*

Arthur M. Keller, Richard Jensen and Shailesh Agarwal, Persistence Software: Bridging Object–Oriented Programming and Relational Databases, pp. 523–528 (1993).

(Continued)

Primary Examiner—Deandra M Hughes (57) ABSTRACT

A mapping between an object model and a relational database is generated to facilitate access to the relational database. The object model can be created from database schema or database schema can be created from the object model. Further, the mapping can be automatically generated. The Database schema, object model and mapping are employed to provide interface objects that are utilized by a runtime engine to facilitate access to the relational database by object oriented software applications.

U.S. PATENT DOCUMENTS

| | | |
|---|---|---|
| 5,142,674 A | 8/1992 | Barker et al. |
| 5,157,777 A | 10/1992 | Lai et al. |
| 5,161,223 A | 11/1992 | Abraham |
| 5,161,225 A | 11/1992 | Abraham et al. |
| 5,170,446 A | 12/1992 | Sullivan et al. |
| 5,175,848 A | 12/1992 | Dysart et al. |
| 5,185,885 A | 2/1993 | Dysart et al. |
| 5,187,786 A | 2/1993 | Densmore et al. |
| 5,187,787 A | 2/1993 | Skeen et al. |
| 5,187,790 A | 2/1993 | East et al. |
| 5,191,522 A | 3/1993 | Bosco et al. |
| 5,193,180 A | 3/1993 | Hastings |
| 5,206,951 A | 4/1993 | Khoyi et al. |
| 5,212,787 A | 5/1993 | Baker et al. |
| 5,227,967 A | 7/1993 | Bailey |
| 5,235,701 A | 8/1993 | Ohler et al. |
| 5,265,206 A | 11/1993 | Shackelford et al. |
| 5,283,894 A | 2/1994 | Deran |
| 5,291,583 A | 3/1994 | Bapat |
| 5,291,593 A | 3/1994 | Abraham et al. |
| 5,295,256 A | 3/1994 | Bapat |
| 5,295,259 A | 3/1994 | Horne |
| 5,315,709 A | 5/1994 | Alston, Jr. et al. |
| 5,327,559 A | 7/1994 | Priven et al. |
| 5,369,761 A | 11/1994 | Conley et al. |
| 5,386,564 A | 1/1995 | Shearer et al. |
| 5,388,264 A | 2/1995 | Tobias, II et al. |
| 5,499,371 A | 3/1996 | Henninger et al. |
| 5,504,885 A | 4/1996 | Alashqur |
| 5,542,078 A | 7/1996 | Martel et al. |
| 5,586,311 A | 12/1996 | Davies et al. |
| 5,596,746 A | 1/1997 | Shen et al. |
| 5,615,362 A | 3/1997 | Jensen et al. |
| 5,627,979 A | 5/1997 | Chang et al. |
| 5,659,723 A | 8/1997 | Dimitrios et al. |
| 5,694,597 A | 12/1997 | Cantin et al. |
| 5,694,598 A | 12/1997 | Durand et al. |
| 5,696,961 A | 12/1997 | Briscoe et al. |
| 5,701,453 A | 12/1997 | Maloney et al. |
| 5,706,506 A | 1/1998 | Jensen et al. |
| 5,717,924 A | 2/1998 | Kawai |
| 5,727,203 A | 3/1998 | Hapner et al. |
| 5,729,739 A | 3/1998 | Cantin et al. |
| 5,734,887 A | 3/1998 | Kingberg et al. |
| 5,737,597 A | 4/1998 | Blackman et al. |
| 5,752,027 A | 5/1998 | Familiar |
| 5,761,656 A | 6/1998 | Ben-Shachar |
| 5,765,162 A | 6/1998 | Blackman et al. |
| 5,778,375 A | 7/1998 | Hecht |
| 5,809,505 A | 9/1998 | Lo et al. |
| 5,812,996 A | 9/1998 | Rubin et al. |
| 5,819,086 A | 10/1998 | Kroenke |
| 5,829,006 A | 10/1998 | Parvathaneny et al. |
| 5,850,544 A | 12/1998 | Parvathaneny et al. |
| 5,857,197 A | 1/1999 | Mullins |
| 5,873,093 A | 2/1999 | Williamson et al. |
| 5,875,333 A | 2/1999 | Fish et al. |
| 5,878,411 A | 3/1999 | Burroughs et al. |
| 5,893,108 A | 4/1999 | Srinivasan et al. |
| 5,897,634 A | 4/1999 | Attaluri et al. |
| 5,924,100 A | 7/1999 | Chang et al. |
| 5,937,402 A | 8/1999 | Pandit |
| 5,937,409 A | 8/1999 | Wetherbee |
| 5,956,725 A | 9/1999 | Burroughs et al. |
| 5,956,730 A | 9/1999 | Burroughs et al. |
| 5,977,967 A | 11/1999 | Berner et al. |
| 6,047,284 A | 4/2000 | Owens et al. |
| 6,061,515 A | 5/2000 | Chang et al. |
| 6,076,090 A | 6/2000 | Burroughs et al. |
| 6,078,926 A | 6/2000 | Jensen et al. |
| 6,085,198 A | 7/2000 | Skinner et al. |
| 6,108,664 A | 8/2000 | Nori et al. |
| 6,122,627 A | 9/2000 | Carey et al. |
| 6,134,540 A | 10/2000 | Carey et al. |
| 6,163,776 A | 12/2000 | Periwal |
| 6,173,290 B1 | 1/2001 | Goldberg |
| 6,175,837 B1 | 1/2001 | Sharma et al. |
| 6,223,227 B1 | 4/2001 | Williamson et al. |
| 6,226,637 B1 | 5/2001 | Carey et al. |
| 6,240,422 B1 | 5/2001 | Atkins et al. |
| 6,374,252 B1 | 4/2002 | Althoff et al. |
| 6,385,618 B1 | 5/2002 | Ng et al. |
| 6,466,992 B2 | 10/2002 | Williamson et al. |
| 6,704,744 B1 | 3/2004 | Williamson et al. |
| 6,952,706 B2 | 10/2005 | Williamson et al. |
| 7,127,474 B2 | 10/2006 | Williamson et al. |

OTHER PUBLICATIONS

InfoBase Software Specification, pp. 1–121 (1990).

InfoBase User Manual, pp. 1–50 (1989).

Weiyi Mang, Clement Yu, Wong Kim, Gaoming Wang, Tracy Pham and Son Dao, Construction of a Relational Front–end for Object–Oriented Database Systems, pp. 476–483 (1993).

Michael R. Blaha, William J. Premerlani, and James E. Rumbaugh, Relational Database Design Using an Object–Oriented Methodology, pp. 414–427 (1988).

C. Souza dos Santos and E. Theroude, Persistent Java, pp. 1–22 (1996).

Red Hat, Inc. & Red Hat Middleware, LLC, Defendants Red Hat, Inc. and Red Hat Middleware, LLC'S Invalidity Contentions, litigation document, Aug. 6, 2007, pp. 1–41, United States District Court For The Eastern District of Texas Marshall Division.

Red Hat, Inc. & Red Hat Middleware, LLC, Defendants Red Hat, Inc. and Red Hat Middleware, LLC'S Supplemented Invalidity Contentions, litigation document, Feb. 7, 2008, pp. 1–266 (including the Exhibits), United States District Court For The Eastern District of Texas Marshall Division.

Civil Action No. 2:06–CV–258 (TJW), entitled as "Joint Claim Construction and Prehearing Statement," pp. 1–7.

Civil Action No. 2:06–CV–258 (TJW), entitled as "Firestar Software, Inc's Claim Construction Brief Pursuant to P.R.4–5(a)" pp. 1–35 (excluding exhibits).

Civil Action No. 2:06–CV–258 (TJW), entitled as "Red Hat's Claim Construction Brief" pp. 1–34.

Civil Action No. 2:06–CV–258 (TJW), entitled as "Firestar Software, Inc.'s Reply Brief Pursuant to P.R.4–5(c)" pp. 1–17.

Civil Action No. 2:06–CV–258 (TJW), entitled as "Red Hat's Sur–Reply Brief Regaring Claim Construction" pp. 1–7.

Rotterdam, Ernest, OORL: A Declarative and Object Oriented Database Language (Aug. 8, 1995).

Presentations of the OOPSLA '95 Workshop: Objects and Relational Databases, (Oct. 16, 1995).

Abiteboul, Serge, O2 Java ODMG Binding Presentation, May 23, 1997 ("JRB Presentation").

Application Devlopment—Oracle Plans to Pave Object Path With Sedona Project, Infoworld Publishing Company (Aug. 13, 1995).

Barsalou, Thierry, et al., Complex Objects for Relational Databases, Computer Aided Design, vol. 22, No. 8 ("Complex Objects").

Barsalou, Thierry, et al., Knowledge–Directed Mediation Between Application Objects and Base Data, Data Knowledge Base Integration: Proceedings of the Working Conference ("Knowledge–Directed Mediation").
Barsalou, thierry, et al., Updating Relational Databases Through Object–Based Views, AM SIGMOD International Conference on Management of Data, vol. 20, No. 2 ("Updating Relational Databases").
Campbell, The Object Oriented Design and Implementation of a Rlational Database Management System.
Core Functionality for Object to Relations Maps, Oracle Corporation (1996).
Data Access Builder ("DAX Builder").
Data Access Builder Implementation Overview ("DAX Implementation Overview").
Data Access Builder Window ("DAX Builder Window").
Documentation relating to Pocket (1996–1997), produced by Sun under separate cover.
Enterprise Object Framework Developer's Guide: NeXT-Step Developer's Library.
Enterprise Objects Framework Developer's Guide: OpenStep Developer's Library, NeXT Computer, Inc. (1996) ("OpenStep Developer's Library").
Fishman, D.H., et al., "IRIS: An Object–Oriented Database Management System," ACM Transactions on Office Information Systems, vol. 5, No. 1 ("Fishman '87").
Fitsilis, P., Producting Relational Database Schemata from an Object Oriented Design, IEEE (1994) ("Producing Relational Database Schemata").
Gardarin, Georges, et al. Managing Complex Objects in an Extensible Relational DBMS, Proceedings of the Fifteenth International Conference on Very Large Data Bases pp. 55–56 ("Gardarin 1989").
InfoBase for Smalltalk –80 Release 1.0 External reference Specification, Rev. 2.2 ("Infobase ERS").
InfoBase User's Manual, ParcPlace Systems, Inc. Rev. 4 ("InfoBase Manual").
Introduction to TOPLink Version 2.1 ("TOPLink for SmallTalk v. 2.1 Manual").
Java Blend/Pocket ("Java Blend/Pocket").
Java Blend source code (1996–1997).
John Petrie, "Object Integration Server" Presentations of OOPSLA '95 Workshop Objects and Relational Databases ("ONTOS OIS Presentation").
John Petrie, "ONTOS Object Integration Server (ONTOS OIS): Integrating Objects with Relational Databases Technical Overview" Proceedings of the OOPSLA '95 Workshop Objects and Relational Databases ("ONTOS OIS Technical Overview").
Joss Object Services Persistence Service Specification, OMG TC No. 93.11.3 ("JOSS").
Kelley, W. et al., "Schema Architecture of the UniSQL/M Multidatabase System," Modern Database Systems: The Object Model, Interoperability, and Beyond ("UniSQL/M Schema Architecture").
Kleindienst, Jan, et al., "Lessons Learned from Implementing the CORBA Persistent Object Service" OOPSLA '96 ("Kleindienst").
Kleissner, Charly "Enterprise Objects Framework: A Second Generation Object–Relational Enabler" SIGMOD, Jun. 1995 ("Kleissner EOF").
Klug, A., et al., "Multiple View Support within the ANSI/SPARC Framework," Proceedings of the Third International Conference on Very Large Databases ("Klug").

Kyriakakis, Ted, Subtleware Post (Feb. 8, 1994 ("Subtleware Post").
Law, Kincho et al., Managing Design Objects in a Sharable Relational Framework (1990) ("Managing Design Objects").
Law, Kincho, Management of Complex Structural Engineering Objects in a Relational Framework, Engineering with Computers, Issue 6 (1990) ("Complex Structural Engineering Objects").
Lee, B. et al., "Efficiency instantiating view–objects from remote relational databases," The International Journal on Very Large Data Vases, vol. 3, No. 3, pp. 289–323 ("Lee VLDB 1994").
Lee, B. et al., Outer joins and filters for instantiating objects from relational databases through views, IEEE Transactions on Knowledge and Data Engineering (Feb. 1994) vol. 6, No. 1 p. 108–19 ("Lee IEEE 1994").
Manola, Frank Integrating Object Oriented Applications and Middleware with Relational Databases, GTE, Laboratories, Inc. ("Manola").
"Marketing Brief on Java Blend" (Mar. 20, 1997).
NeXTStep Enterprise Objects Framework Developer's Guide: NeXTStep Developer's Library, Release 3 (1994).
Novera EPIC DB Blend ("Novera").
O2 Java Relational Binding, at http://web.arquive.org/1997022231614/http://www.o2tech.fr/ (Feb. 26, 1996) ("O2 JRB Website").
"Object/Relational Integration: ONTOS Object Integration Server" Advertisement (May 1996).
ONTOS Object Integration Server for Relational Databases 1.0: Schema Mapper User's Guide, (ONTOS, Inc. 1989–1994) (Nov., 1994), Proceedings of the OOPSLA '95 Workshop: Objects and Relational Databases, (Oct. 16, 1995).
ONTOS OIS for Relational Databases 1.0: Schema Mapper User's Guide ("ONTOS SMUG").
Oracle7 Server SQL Reference Manual: Elements of Oracle7 SQL ("Oracle Elements").
Oracle7 Server SQL Reference Manual: Commands ("Oracle Commands").
Oracle Floats Plan, Computerworld via First! By Individual, Inc. (Feb. 19, 1995).
Oracle's public deminstrations of the product in 1996.
Persistence Demonstration for SIGMOD '93 ("Persistence Video").
Persistence Demonstration for SIGMOD '93 Video, and Persistence User Manual, Version 1.2 (Persistence Software 1992) (Mar. 1993).
Persistence User Manual—Version 1.2 ("Persistence Manual").
Proceedings of the OOPSLA '95 Workshop: Objects and Relational Databases, (Oct. 16, 1995).
Pröll, Elisabeth, Design of a Meta Data Base for Mapping Complex Objects in a Relational Data Base ("COMan Thesis").
Reinwald, Storing and Using Objects in a Relational Database, IBM Systems Journal, vol. 35, No. 2 ("Reinwald").
Rowe, L., "A Shared Object Hierarchy," (Revised) ("Rowe '87").
Sedona Build 092 Oracle Corp. ("Sedona Code").
Sedona Product Demonstration ("Sedona Product Demo").
Sedona v. 1.00 Installation and Release Notes, (Oracle Corporation 1996).

Souza dos Santos, C., Persistent Java, First International Workshop on Persistence and Java ("Persistent Java").

Srinivasan, V., Object Persistence in Object Oriented Applications, IBM Systems Journal, vol. 36, No. 1, 66–87 ("Srinivasan Persistence").

Subtleware for C++/Oracle: User Guide (1993–1995) ("Subtleware Users Guide").

Subtleware, Demonstration Guide (1995) ("Subtleware Demonstration Guide").

Sujanski, Walter, Structural Semantics and Complex Objects for the Coupling of Relational Databases and Knowledge–Based Systems, (1990) ("Coupling Relational Databases and Knowledge–Based Systems").

Thelen, F. et al., "POET SQL Object Factory: Technical Overview" ("POET").

TOPLink for Smalltalk Version 2.0 distributed code ("Toplink for V 2.0 Code").

TOPLink for SmallTalk Version 4.0 Manual (TOPLink for SmallTalk V. 4.0).

TOPLink Java Version 1.0 User's Manual ("TOPLink for Java V 1.0 Manual").

TOPLink Smalltalk Version 2.0 User's Manual ("TOPLink for SmallTalk V. 2.0 Manual").

Verona Applications Requirements & Applications Framework Strategy ("Verona Framework").

Verona Major Features Design Document: Applications Technology Object–Oriented Applications ("Verona Major Features").

Visual Works Object Reference, Rev. 1.1 ("VisualWorks Object Reference").

Visual Works User's Guide, Rev. 2.0 ("VisualWorks User's Guide").

Wiederhold, Gio, et al., "Integrating Data into Objects Using Structural Knowledge," Third International Symposium on Command and Control Research and Technology, National Defense University ("Integrating Data into Objects").

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

New claims 19–44 are added and determined to be patentable.

19. The method of claim 1 further comprising reading the map with the runtime engine to at least one of, read data from and write data to the relational database.

20. The method of claim 19 wherein the reading the map comprises loading information from the map at runtime.

21. The method of claim 1 further comprising creating an instance of a runtime engine class by the runtime engine to abstract relational database access functionality from the object oriented software application, wherein the relational database access functionality comprises reading and writing data.

22. The method of claim 21 wherein the creating comprises creating one instance of the runtime engine class by the runtime engine for every interface object instance.

23. The method of claim 19 further comprising generating at least one mapping model file containing at least some mapping information from the map, wherein the generating at least one mapping model file occurs prior to utilizing the runtime engine.

24. The method of claim 23 wherein reading the map further comprises loading information from one or more mapping model files by the runtime engine.

25. The method of claim 1 further comprising executing a query by the runtime engine to one of, retrieve or store particular data after detecting a need to one of, use or modify the particular data by the software application.

26. The method of claim 19 further comprising executing a query by the runtime engine to one of, retrieve or store particular data after detecting a need to one of, use or modify the particular data by the software application, wherein executing the query occurs after reading the map.

27. The method of claim 19 wherein utilizing the runtime engine comprises invoking at least one interface object after reading the map with the runtime engine.

28. The computer program of claim 10 wherein said runtime engine comprises at least one shared library.

29. The computer program of claim 28 wherein said at least one shared library includes executable loading code for the loading mapping information from the map.

30. The computer program of claim 28 wherein said at least one shared library includes executable abstracting code for abstracting relational database access functionality from the object oriented software application, wherein the relational database access functionality includes reading and writing data.

31. The computer program of claim 28 wherein said at least one shared library includes at least one dynamic link library (DLL).

32. The method of claim 1 wherein said utilizing is further defined as the object oriented software application invoking at least one interface object to request data from the relational database corresponding to at least one attribute of at least one object corresponding to a class associated with the object oriented software application.

33. The method of claim 32 wherein said utilizing is further defined as at least one interface object invoking the runtime engine to obtain data requested by the object oriented software application.

34. The method of claim 33 wherein said utilizing is further defined as at least one interface object calling a method on a runtime engine object.

35. The method of claim 33 wherein said utilizing is further defined as the runtime engine accessing the database to obtain the data requested by the object oriented software application.

36. The method of claim 35 wherein said utilizing is further defined as the runtime engine reading the map to determine at least one table and at least one column that needs to be accessed to obtain the data requested by the object oriented software application.

37. The method of claim 35 wherein said utilizing is further defined as the runtime engine invoking at least one database object to execute a database query.

38. The method of claim 33 wherein said utilizing is further defined as the runtime engine invoking at least one interface object to deliver the data requested by the object oriented software application.

39. The method of claim 1 further defined as creating the object model corresponding to the object oriented software application.

40. The method of claim 39 further defined as creating schema in the database based on the object model.

41. The method of claim 1 further defined as creating schema in the database.

42. The method of claim 41 further defined as creating the object model corresponding to the object oriented software application based on schema in the database.

43. The computer program of claim 10 wherein the runtime engine includes a runtime engine class for defining at least one method to abstract relational database access functionality from the object oriented software application, and wherein the relational database access functionality comprises reading and writing data.

44. The computer program of claim 43 wherein an instance of the runtime engine class is created for each interface object instance.

* * * * *